(12) United States Patent
Saito et al.

(10) Patent No.: US 7,824,020 B2
(45) Date of Patent: Nov. 2, 2010

(54) LIQUID FEED TUBE FOR LIQUID JETTING DEVICE AND LIQUID JETTING DEVICE

(75) Inventors: Youkou Saito, Kanagawa (JP); Tadashi Utsunomiya, Kanagawa (JP); Toshio Kumagai, Nagano (JP); Hitoshi Matsumoto, Nagano (JP); Masanori Takemura, Nagano (JP); Kazuyuki Saito, Nagano (JP); Yasushi Soya, Nagano (JP)

(73) Assignees: Bridgestone Corporation, Tokyo (JP); Seiko Epson Corporation, Tokyo (JP)

( * ) Notice: Subject to any disclaimer, the term of this patent is extended or adjusted under 35 U.S.C. 154(b) by 743 days.

(21) Appl. No.: 11/587,155

(22) PCT Filed: Apr. 13, 2005

(86) PCT No.: PCT/JP2005/007168

§ 371 (c)(1),
(2), (4) Date: Aug. 20, 2007

(87) PCT Pub. No.: WO2005/102710

PCT Pub. Date: Nov. 3, 2005

(65) Prior Publication Data

US 2008/0211884 A1    Sep. 4, 2008

(30) Foreign Application Priority Data

Apr. 22, 2004   (JP)   .............................. 2004-127288

(51) Int. Cl.
   *B41J 2/175* (2006.01)
(52) U.S. Cl. ............................. 347/85; 347/84; 347/86; 347/87; 347/88; 347/89; 347/90; 347/91; 347/92; 347/93; 347/94
(58) Field of Classification Search ............. 347/84–94
   See application file for complete search history.

(56) References Cited

U.S. PATENT DOCUMENTS 6,981,762 B2 *   1/2006   Mashita et al. ................. 347/86
2003/0218660 A1   11/2003   Matsumoto et al.

FOREIGN PATENT DOCUMENTS

| JP | 5-70659 A | 3/1993 |
| JP | 2000-38460 A | 2/2000 |
| JP | 2003-192867 A | 7/2003 |
| JP | 2003-320680 A | 11/2003 |

* cited by examiner

*Primary Examiner*—Charlie Peng
*Assistant Examiner*—Guy G Anderson
(74) *Attorney, Agent, or Firm*—Sughrue Mion, PLLC (57) ABSTRACT

A liquid feed tube for feeding a liquid from a liquid tank disposed on a liquid jetting device body side to a jetting head mounted on a reciprocating carriage, including: a long elastic member and a film member connected in an airtight state to the elastic member along a longitudinal direction of the elastic member; and a space part formed by the elastic member and the film member and used as a liquid feed passage, wherein the elastic member is made of a specific resin composition. Thus, the bending rigidity of the liquid feed tube can be lowered, and the resistance to moisture permeability and the gas barrier property thereof can be realized at low cost.

6 Claims, 8 Drawing Sheets

LIQUID FEED TUBE FOR LIQUID JETTING DEVICE AND LIQUID JETTING DEVICE

TECHNICAL FIELD

The present invention relates to a liquid feed tube for feeding a liquid from a liquid tank disposed on a liquid jetting device body side to a jetting head mounted on a reciprocating carriage, and a liquid jetting device using the same.

BACKGROUND ART

Up to now, as a liquid jetting device for jetting a liquid to a target, there is an ink-jet recording apparatus that jets an ink droplet to paper to print an image or the like thereon. This ink-jet recording apparatus includes a jetting head (hereinafter, referred to as recording head), which is mounted on a carriage and reciprocates in a main scanning direction, and means for transporting a target (hereinafter, referred to as recording sheet) in a sub-scanning direction perpendicular to the main scanning direction, and jets a liquid droplet (hereinafter, referred to as ink droplet) from a recording head based on jetting data (hereinafter, referred to as printing data), whereby printing is performed with respect to the recording sheet. In most of the recording apparatus of this type mainly used for home use, each liquid tank (referred to as ink tank) for feeding ink to a recording head is configured so as to be attached/detached with respect to a carriage on which the recording head is mounted.

In a recording apparatus of an on-carriage type in which an ink tank is mounted on a carriage as described above, it is difficult to use an ink tank with a large capacity, and hence, in the case where an attempt is made to execute printing of a relatively large amount, it is necessary to replace an ink tank frequently. This not only requires the work for a replacement operation of a tank, but also increases a running cost.

Thus, for example, in the recording apparatus of this type used for a commercial purpose, a configuration of an off-carriage type is adopted in which an ink tank with a large capacity is placed on a body side of a recording apparatus, and ink is fed respectively to a recording head mounted on a carriage via a flexible liquid feed tube (hereinafter, referred to as ink feed tube) from the ink tank (for example, see Patent Document 1). Further, regarding a low-hardness thermoplastic material for an ink-jet printer, there is description in Patent Document 2.

Patent Document 1: JP 2003-320680 A
Patent Document 2: WO 03/027183

DISCLOSURE OF THE INVENTION

In such a recording apparatus of the off-carriage type, as a print size (i.e., size of a printable sheet) increases, an ink feed tube run length becomes larger, so the dynamic pressure (i.e., pressure loss) in the ink feed tube from an ink tank to a carriage becomes large. This makes it necessary to adopt ink feed tubes each having a larger inner diameter.

In addition, in most of the ink feed tubes used in the above-mentioned recording apparatus of the off-carriage type, the cross-section thereof is set to be a circular shape, and hence, the bending rigidity thereof is basically large. Thus, in case of adopting ink tubes having larger inner diameter as mentioned above, the bending rigidity further increases. Therefore, in order to overcome the bending rigidity, it is necessary to further enhance the driving force of the carriage. Further, each tube must be designed so that the bending diameter thereof becomes larger along with the increase in the bending rigidity. In any case, the recording apparatus is caused to be further enlarged.

On the other hand, in the above-mentioned ink feed tube, it is necessary to suppress the evaporation of moisture that forms a main part of an ink medium, and further, there is a problem in that the outside air is dissolved in the ink in the tube to decrease a deaeration degree of the ink. Therefore, it may adopt to enlarge the thickness of an ink feed tube. However, in the case of enlarging the thickness of the tube in this manner, the above-mentioned increase in the bending rigidity of the tube becomes conspicuous.

As a material for forming a tube, it may adopt to use a low-hardness thermoplastic material with high airtightness as described in Patent Document 2. However, in order to obtain a material with a low hardness so as to decrease the rigidity of the tube, it is necessary to add a large amount of liquid polymer and oil component, and consequently, the airtightness of the material may be degraded.

Further, a suggested method is to form a tube in two layers or three layers so as to enhance the resistance to moisture permeability and the gas barrier property. However, forming a tube configured so as to have a cross-section of a circular shape in a multi-layered structure basically cannot avoid involving the above-mentioned increase in bending rigidity. Further, forming the tube into two-layer or three-layer structure, a die or the like for forming each layer is required for an extruder, which causes an increase in costs.

The present invention has been made in view of the above-mentioned technical problem of a liquid feed tube for feeding a liquid from a liquid tank disposed on a liquid jetting device body side to a jetting head on a carriage side as in the above-mentioned ink-jet recording apparatus, and an object of the present invention is to provide a liquid feed tube for a liquid jetting device capable of realizing the resistance to moisture permeability and the gas barrier property with low cost, as well as decreasing the bending rigidity thereof, and a liquid jetting device.

A liquid feed tube according to the present invention which has been made to attain the above-mentioned object is a liquid feed tube for feeding a liquid from a liquid tank disposed on a liquid jetting device body side to a jetting head mounted on a reciprocating carriage, comprising: a long elastic member and a film member connected in an airtight state to the elastic member along a longitudinal direction of the elastic member; and a space part formed by the elastic member and the film member and used as a liquid feed passage, wherein the elastic member is made of a resin composition containing (A) a (b)-(a)-(b) type isobutylene-based triblock copolymer having (a) a polymer block mainly including an isobutylene unit and (b) a polymer block mainly including a styrene unit, (B) an ethylene-based polymer and/or a propylene-based polymer, and (C) a liquid polybutene, and having the following features (first invention):

(1) an air permeability [JIS K7126; A-method (differential pressure method), 40° C.] measured using a sheet sample with a thickness of 0.5 mm is 200 cm$^3$/(m$^2$·24 hr·atm) or less;
(2) a moisture permeability (JIS Z0208; 40° C., 90% RH) measured using a sheet sample with a thickness of 0.5 mm is 2.0 g/(m$^2$·24 hr) or less;
(3) a hardness [JIS K6253 (15 seconds later) is 30 to 60 degrees in terms of JIS-A hardness; and
(4) a melt flow rate [MFR] (JIS K7210; 190° C., 52.185 N(5.325 Kgf)) is 100 g/10 minutes or less.

Alternatively, the liquid feed tube of the present invention is characterized in that the elastic member is composed of a resin composition containing (D) a (b)-(a)-(b) type isobutylene-based triblock copolymer with a weight-average molecular weight of 50,000 to 80,000, having (a) a polymer block mainly including an isobutylene unit and (b) a polymer block mainly including a styrene unit and (E) a (d)-(c)-(d) type isobutylene-based triblock copolymer with a weight-average molecular weight of 90,000 to 130,000, having (c) a polymer block mainly including an isobutylene unit and (d) a polymer block mainly including a styrene unit in a mass ratio of 20:80 to 60:40, and having the following features (second invention):
(1) an air permeability [JIS K7126; A-method (differential pressure method), 40° C.] measured using a sheet sample with a thickness of 0.5 mm is 200 cm$^3$/(m$^2$·24 hr·atm) or less;
(2) a moisture permeability (JIS Z0208; 40° C., 90% RH) measured using a sheet sample with a thickness of 0.5 mm is 2.0 g/(m$^2$·24 hr) or less;
(3) a hardness [JIS K6253 (15 seconds later) is 30 to 60 degrees in terms of JIS-A hardness; and
(4) a melt flow rate [MFR] (JIS K7210; 270° C., 98.066 N(10 Kgf)) is 5000 g/10 minutes or less.

According to a liquid jetting device using a liquid feed tube of the present invention, the liquid feed tube includes: a long elastic member and a film member connected to the elastic member in an airtight state in a longitudinal direction of the elastic member; and a space part formed by the elastic member and the film member and used as a liquid feed passage, in which a particular member is used as the elastic member. Therefore, the bending rigidity thereof can be decreased, and the degree at which resistance is given to the reciprocating movement of a carriage can be reduced remarkably.

BRIEF DESCRIPTION OF THE DRAWINGS

[FIG. 9(A) and (B) are a] cross-sectional view and a perspective View showing another preferable example of the ink feed tube.

[FIG. 10(A) and (B) are a] cross-sectional view and a perspective view showing still another preferable example of the ink feed tube.

DESCRIPTION OF SYMBOLS 1 carriage
5 sheet feed member as means for transporting target
7 recording sheet as target
8 recording head as jetting head
10 capping means
13 wiping member
15 tank holder
16B to 16Y ink tank as liquid tank
17, 19 connected member
20 ink feed tube as liquid feed tube
20a bent portion
21 connecting member
22 connecting tube formed in a cylindrical shape
23 connecting tube formed in a prism shape
25 opening portion
31 elastic member
32 film member
33 ink feed passage (space part) as liquid feed passage
34 thin film (aluminum laminate layer)
36 cut-away portion
37 enlarged space part

BEST MODE FOR CARRYING OUT THE INVENTION

Figure 1:
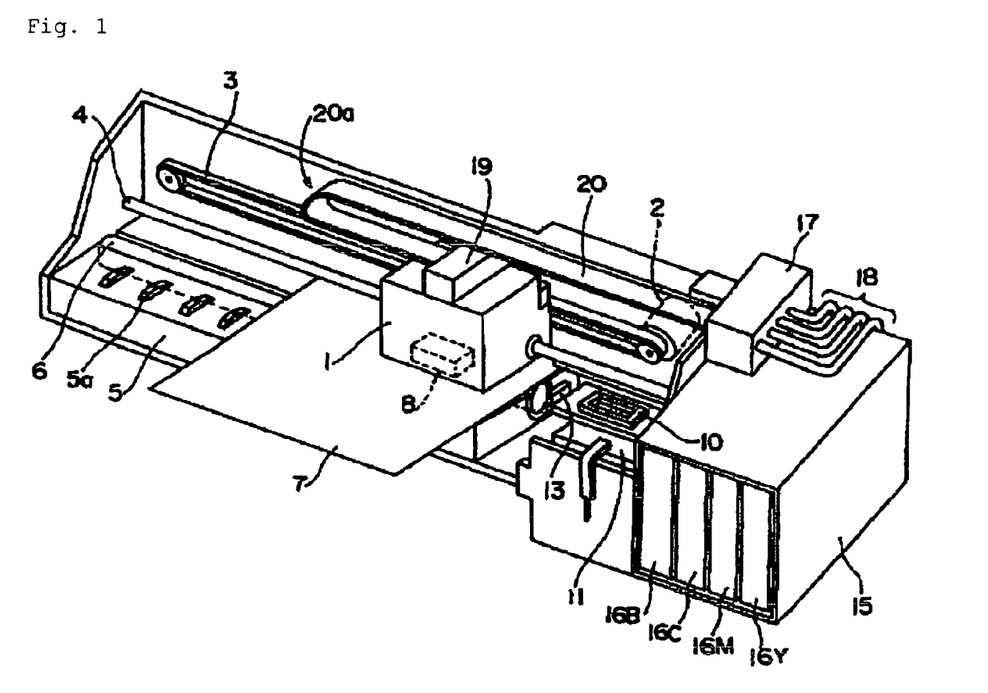
[FIG. 1] A perspective view showing an entire configuration of a recording apparatus using an ink feed tube according to the present invention.

Hereinafter, an ink-jet recording apparatus using an ink feed tube according to the present invention will be described with reference to an embodiment shown in the drawings. FIG. 1 is a perspective view showing a basic configuration of a recording apparatus body. In FIG. 1, reference numeral 1 denotes a carriage, and the carriage 1 is configured so as to be guided by a guide member 4 to reciprocate in a main scanning direction along a longitudinal direction of a sheet feed member 5 via a timing belt 3 driven by a carriage motor 2.

A sheet feed roller 6 is placed on the sheet feed member 5, and a recording sheet 7 sandwiched by the sheet feed roller 6 and a driven roller (not shown) is transported in a sub-scanning direction perpendicular to the above-mentioned main scanning direction by the rotation of the sheet feed roller 6. In this case, a number of protrusions 5a are formed intermittently along a longitudinal direction on an upper surface of the sheet feed member 5, and the recording sheet 7 is transported along the upper surface of the protrusions 5a.

Then, on a lower side surface of the carriage 1 opposed to the recording sheet 7, an ink-jet recording head 8 as represented by a broken line is mounted, and an ink droplet is jetted appropriately by the recording head 8 based on printing data, whereby printing can be performed on the recording sheet 7.

On the other hand, reference numeral 10 denotes capping means placed in a non-printing region (i.e., home position), and the capping means 10 can move upward to seal a nozzle formation surface (lower side surface of the recording head 8 in the present embodiment) of the recording head, when the recording head 8 moves immediately above the capping means 10. A suction pump 11 forgiving a negative pressure to an internal space part of the capping means 10 is placed below the capping means 10.

The capping means 10 functions as a lid for sealing the nozzle formation surface of the recording head 8 to suppress the evaporation of an ink medium from a nozzle opening during a non-operating period of the recording apparatus, and allows the negative pressure from the suction pump 11 to the recording head 8 and ink is caused to be sucked and discharged from the recording head, whereby the capping means 10 can execute a cleaning operation of maintaining the ink jetting function of the recording head.

As shown in FIG. 1, on a printing region side adjacent to the capping means 10, a wiping member 13 in which elastic materials such as rubber are formed in a strip shape is placed, and when the carriage 1 reciprocates to the capping means 10 side, the wiping member 13 proceeds or recedes in a horizontal direction to the movement path of the recording head, if required, thereby performing a wiping operation of cleaning by wiping the nozzle formation surface of the recording head 8.

On the other hand, as shown in FIG. 1, in an end portion (right end portion of FIG. 1) of the recording apparatus, a tank holder 15 is provided. In the tank holder 15, as ink tanks, a black ink tank 16B for feeding black ink and respective color ink tanks 16C, 16M, and 16Y for feeding cyan, magenta, and yellow inks can respectively attached/detached from the front side of the apparatus.

Ink transport tubes 18 are connected to a first connected member 17 mounted on an upper portion of the tank holder 15 from the tank holder 15 in which each ink tank is attached, and ink is fed from each of the above-mentioned ink tanks to the first connected member 17 via each ink transport tube 18.

In the present embodiment, although not shown, an outer case of each of the above-mentioned ink tanks is configured in an airtight state, and a flexible ink pack with ink sealed therein is accommodated in each tank case. Then, by supplying pressure air in the outer case constituting the ink tank, each ink is pushed out by pressure air.

On the other hand, a second connected member 19 is also mounted on an upper portion of the above-mentioned carriage 1, and end portions of an ink feed tube 20 according to the present invention are connected to the first and second connected members 17 and 19 via connecting members described later, respectively. Because of this, ink from each ink tank is fed to the carriage side individually, and an ink droplet is jetted by the above-mentioned recording head based on printing data.

In the embodiment shown in FIG. 1, the ink feed tube 20 formed in a flat and long shape is adopted. The ink feed tube 20 is extended in a horizontal direction so that a band-shaped flat surface is in a horizontal state from the above-mentioned first connecting member 17, bent in the horizontal direction via a U-shaped bent portion 20a, and connected to the above-mentioned second connected member 19. Thus, the U-shaped bent portion 20a formed in the above-mentioned ink feed tube 20 successively shifts in the longitudinal direction of the ink feed tube along with the movement of the carriage 1.

Figure 2:
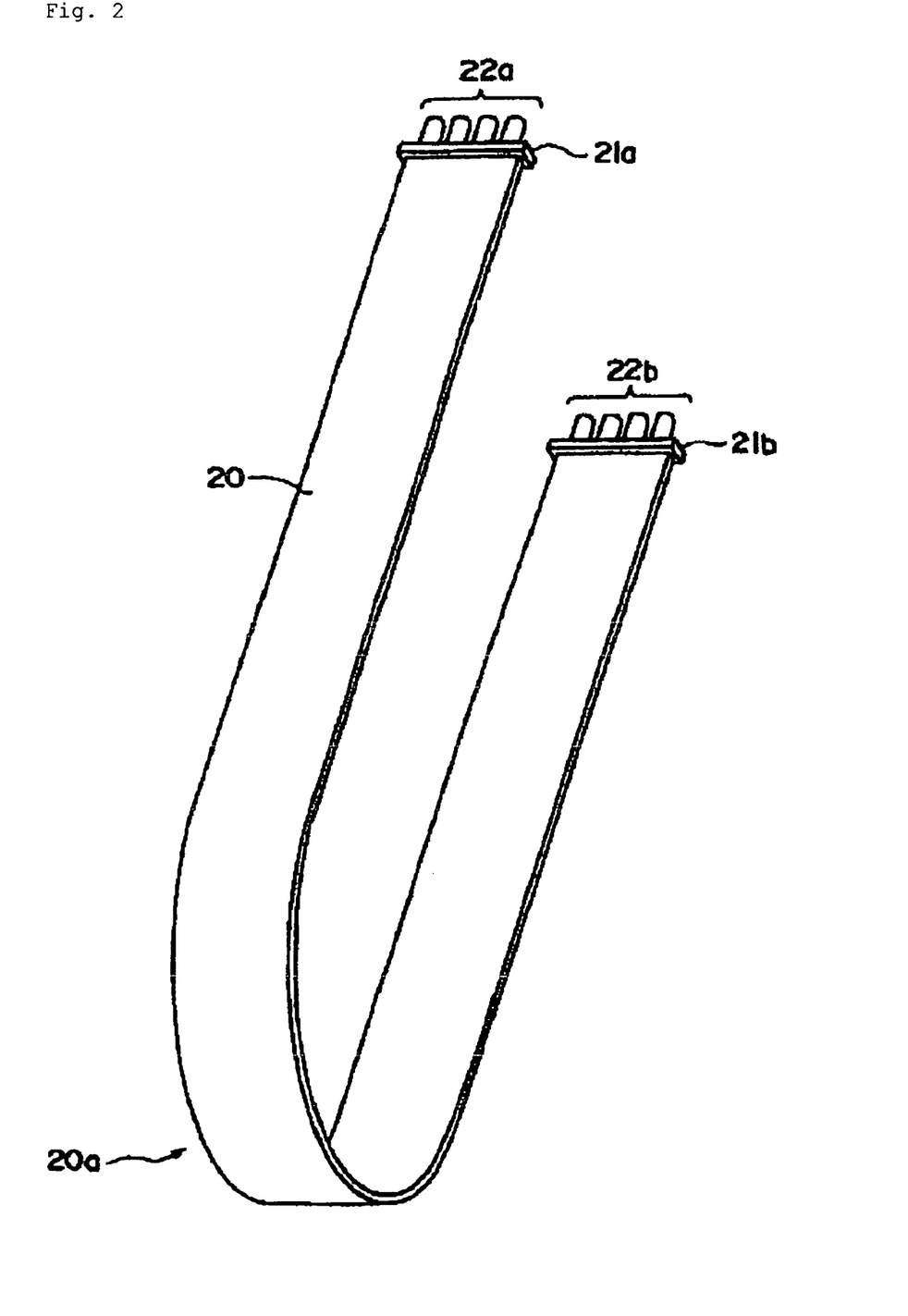
[FIG. 2] A perspective view showing an external appearance configuration of the ink feed tube used in the recording apparatus shown in FIG. 1.

FIG. 2 shows an external appearance configuration of the ink feed tube 20 adopted in the recording apparatus shown in FIG. 1. First and second connecting members 21a and 21b made of synthetic resin are respectively attached to the respective end portions of the ink feed tube 20. In the present embodiment, ink from each of four ink tanks 16B, 16C, 16M, and 16Y attached to the tank holder 15 is fed to the recording head side, and thus, four connecting tubes 22a and 22b formed in cylindrical shapes are respectively formed on the respective connecting members 21a and 21b so as to correspond to the four ink tanks.

The respective connecting tubes 22a formed on the first connecting member 21a are connected to the first connected member 17 shown in FIG. 1, and the respective connecting tubes 22b formed on the second connecting member 21b are connected to the second connected member 19 shown in FIG. 1, whereby each ink is fed to the recording head 8 mounted on the carriage 1. Reference numeral 20a shown in FIG. 2 shows the above-mentioned U-shaped bent portion formed during actual use of the ink feed tube 20 in this embodiment.

Figure 3:
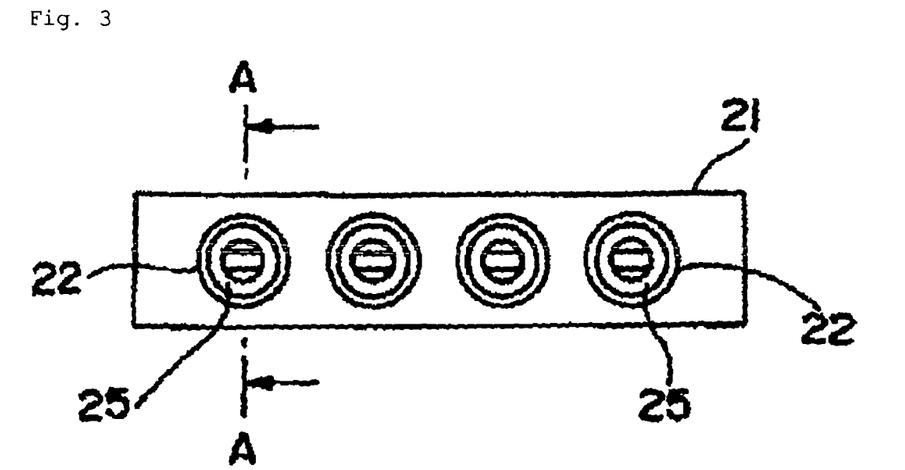
[FIG. 3] A front view showing an enlarged state of the ink feed tube shown in FIG. 2, seen from a connecting member side attached to an end portion of the ink feed tube.
Figure 4:
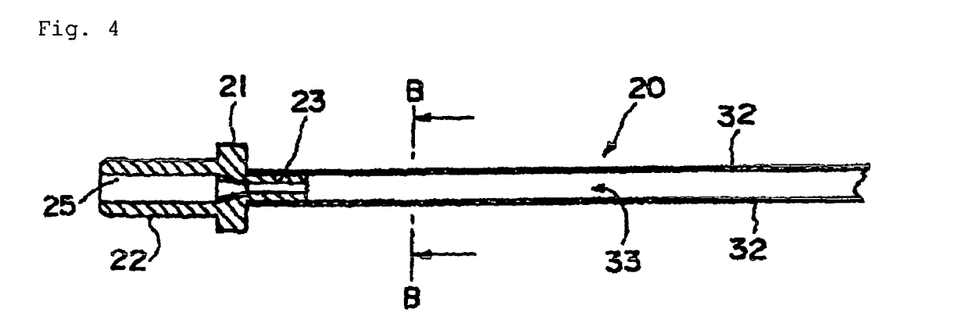
[FIG. 4] A cross-sectional view showing a state taken along the line A-A of FIG. 3 in a direction of arrows.
Figure 5:
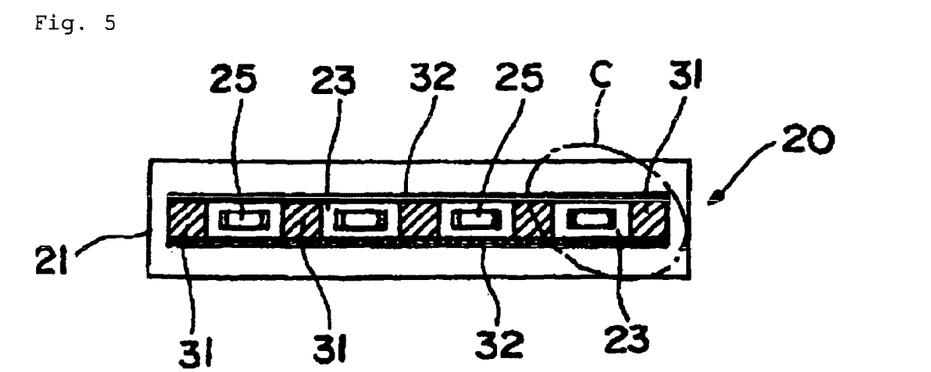
[FIG. 5] A cross-sectional view showing a state taken along the line B-B of FIG. 4 in a direction of arrows.
Figure 6:
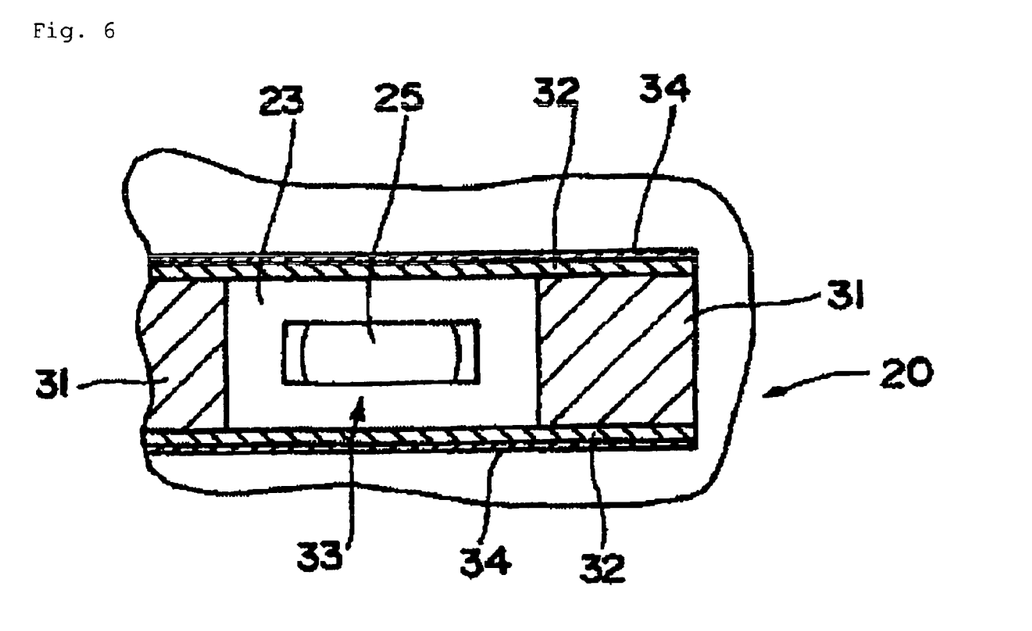
[FIG. 6] A cross-sectional view showing a C portion surrounded by a chain line of FIG. 5 in an enlarged state.

FIGS. 3 to 6 show the configuration in an enlarged state of each part of the ink feed tube 20 whose external appearance configuration is shown in FIG. 2. In other words, FIG. 3 shows a state of the first or second connecting members 21a or 21b seen from an end portion side thereof, and FIG. 4 is a cross-sectional view taken along the line A-A of FIG. 3 in a direction of arrows. Further, FIG. 5 is a cross-sectional view taken along the line B-B of FIG. 4 in a direction of arrows, and FIG. 6 is a cross-sectional view showing a C portion surrounded by a chain line in FIG. 5 in an enlarged state. Note that, the above-mentioned first and second connecting members 21a and 21b are formed in the same shape, and hence, in FIGS. 3 to 6, both connecting members are denoted with reference numeral 21 typically, and all connecting tubes in a cylindrical shape formed on each connecting member are denoted with reference numeral 22 typically.

As shown in FIG. 5, the ink feed tube 20 has a configuration in which five elastic members 31 are arranged in parallel at an equal interval. On one surface and another surface, i.e., upper and lower surfaces, of each of the elastic members 31, film members 32 formed similarly in a long shape is connected to each of the elastic members 31 in an airtight state by heat welding. Consequently, four space parts surrounded by the adjacent elastic members 31 and upper and lower film members 32 are set to be ink feed passages as denoted with reference numeral 33 of FIG. 6, and the respective ink feed passages 33 are formed independently along a long flat surface via the respective elastic members 31.

The first invention of the present invention is characterized in that the elastic member 31 is made of a resin composition containing (A) a (b)-(a)-(b) type isobutylene-based triblock copolymer having (a) a polymer block mainly including an isobutylene unit and (b) a polymer block mainly including a styrene unit, (B) an ethylene-based polymer and/or propylene-based polymer, and (C) liquid polybutene, and having the following features:

(1) an air permeability [JIS K7126; A-method (differential pressure method), 40° C.] measured using a sheet sample with a thickness of 0.5 mm is 200 cm$^3$/(m$^2$·24 hr·atm) or less;

(2) a moisture permeability [(JIS Z0208; 40° C., 90% RH) measured using a sheet sample with a thickness of 0.5 mm is 2.0 g/(m$^2$·24 hr) or less;

(3) a hardness [JIS K6253 (15 seconds later) is 30 to 60 degrees in terms of JIS-A hardness; and (4) a melt flow rate [MFR] (JIS K7210; 190° C., 52.185 N (5.325 Kgf)) is 100 g/10 minutes or less.

Further, it is preferable that the elastic member 31 is a resin composition having the following feature in which (5) tensile strength and elongation (JISK6251; dumbbell-shape No. 3 shape, 23° C.) are 5 MPa or more and 400% or more, respectively.

In the isobutylene-based triblock copolymer of the above-mentioned (A) component, (a) the polymer block mainly including an isobutylene unit denotes a polymer block in which an isobutylene unit occupies 50 mass % or more, preferably 70 mass % or more, and more preferably 90 mass % or more. The monomer forming units other than an isobutylene unit in the polymer block mainly including an isobutylene unit is not particularly limited as long as it is a cation-polymerizable monomer. Examples thereof include monomers such as: aromatic vinyls; aliphatic olefins; dienes such as isoprene, butadiene, and diviylbenzene; allylethers; and β-pinene They may be used alone or in combination of two or more kinds.

On the other hand, (b) the polymer block mainly including a styrene unit denotes a polymer block in which a styrene unit occupies 50 mass % or more, preferably 70 mass % or more, and more preferably 90 mass % or more. The monomer forming units other than a styrene unit in the polymer block mainly including a styrene unit is not particularly limited as long as it is a cation-polymerizable monomer. Examples thereof include monomers such as: aromatic vinyls such as α-methylstyrene, β-methylstyrene, p-methylstyrene, tert-butylstyrene, monochlorostyrene, dichlorostyrene, methoxystyrene, and indene; aliphaticolefins; dienes; allylethers; and β-pinene. They may be used alone or in combination of two or more kinds.

The isobutylene-based triblock copolymer of the above-mentioned (A) component used for compounding is a (b)-(a)-(b) type, and there is no particular limit to the content ratio between (a) the polymer block mainly including an isobutylene unit and (b) the polymer block mainly including a styrene unit. However, in terms of the physical properties of a resin composition to be obtained, the content ratio is preferably (a) the polymer block mainly including an isobutylene unit of 60 to 85 mass % and (b) the polymer block mainly including a styrene unit is 40 to 15 mass %, and more preferably (a) the above-mentioned polymer block of 65 to 80 mass % and (b) the above-mentioned polymer block of 35 to 20 mass %.

Further, there is no particular limit to the weight-average molecular weight of the isobutylene-based triblock copolymer of the above-mentioned (A) component used for compounding. However, in terms of the mechanical characteristics and moldability of a resin composition to be obtained, a range of 40,000 to 200,000 is preferable, and in particular, a range of 50,000 to 150,000 is more preferable. The weight-average molecular weight is a value under polystyrene conversion measured by gel permeation chromatography (GPC method).

There is no particular limit to a method of producing the isobutylene-based triblock copolymer, and a conventionally known method can be used. For example, by using an inifer method (for example, a method disclosed by the specification of U.S. Pat. No. 4,276,394) of performing living cationic polymerization using a monofunctional component such as α-chlor-isopropylbenzene, a bifunctional component such as 1,4-bis(α-chloroisopropyl)benzene (also called p-dicumyl chloride), or a trifunctional component such as 1,3,5-tris(α-chloroisopropyl)benzene as an initiator and chain transfer agent, and using Lewis acid such as $BCl_3$ or $TiCl_4$ as a catalyst, a polymer mainly including an isobutylene unit of a controlled molecular weight is formed, and subsequently, a monomer mainly including styrene is added to cause copolymerization, whereby a desired isobutylene-based triblock copolymer can be obtained.

In the resin composition of the first invention, as the (B) component, an ethylene-based polymer and/or a propylene-based polymer are/is used.

Examples of the ethylene-based polymer include high-density, medium-density, and low-density polyethylenes, linear low-density polyethylene, ultra high molecular weight polyethylene, an ethylene-vinyl acetate copolymer, and an ethylene-ethyl acrylate copolymer.

On the other hand, examples of the propylene-based polymer include a propylene single polymer, a propylene-ethylene block copolymer, a random copolymer, and a propylene-ethylene-diene compound copolymer. Among them, crystalline polypropylene-based resin is preferable, and examples of the crystalline polypropylene-based resin include an isotactic propylene single polymer having crystallinity, an ethylene-propylene random copolymer containing a small amount of ethylene units, a propylene block copolymer composed of a homo part made of a propylene single polymer and a copolymer part made of an ethylene-propylene random copolymer containing a relatively large amount of ethylene units, and a crystalline propylene-ethylene-α-olefin copolymer obtained by copolymerizing each homo part or copolymer part in the propylene block copolymer with a-olefin such as butene-1.

By containing the (B) component, the heat seal property of a resin composition is enhanced, and the shrinkage ratio thereof during molding decreases.

In the resin composition according to the first invention, as the (B) component, one kind or two or more kinds of the above-mentioned ethylene-based polymer may be mused, and one kind or two or more kinds of the propylene-based polymer may be used. Further, at least one kind of the ethylene-based polymer may be combined with at least one kind of the propylene-based polymer.

In the resin composition according to the first invention, as the liquid polybutene used as the (C) component, the one having a number-average molecular weight of about 200 to 3,000 mainly including an isobutylene unit is preferable. As such liquid polybutene, for example, a low polymer mainly including isobutylene obtained by copolymerizing a slight amount of butene-1 produced using, as it is, the remaining fraction that is obtained by extracting butadiene from a $C_4$ fraction generated by naphtha cracking, or liquid butyl rubber obtained by copolymerizing a small amount of isoprene with a low polymer of high-purity isobutylene or isobutylene. They may be used alone in one kind, or in a combination of two or more kinds. Owing to the presence of those liquid polybutenes, in the resin composition, the water vapor barrier properties as well as the flexibility of the resin composition are enhanced.

The resin composition according to the first invention of the present invention has properties shown below.

First, the air permeability [JIS K7126; A-method (differential pressure method), 40° C.] measured using a sheet sample with a thickness of 0.5 mm based on an A-method (differential pressure method) of JIS K7126 is 200 $cm^3$/($m^2 \cdot 24$ hr·atm) or less, which shows excellent gas barrier property. The air permeability is preferably 180 $cm^3$/($m^2 \cdot 24$ h·atm) or less, and more preferably 160 $cm^3$/($m^2 \cdot 24$ hr·atm) or less. Although there is no particular lower limit to the air permeability, it is usually 50 $cm^3$/($m^2 \cdot 24$ hr·atm).

Further, the moisture permeability (JIS Z0208; 40° C., 90% RH) measured using a sheet sample with a thickness of 0.5 mm based on JIS Z0208 is 2.0 g/($m^2 \cdot 24$ hr) or less, which shows excellent barrier properties with respect to water vapor. The moisture permeability is preferably 1.8 g/($m^2 \cdot 24$ hr) or less, more preferably 1.7 g/($m^2 \cdot 24$ hr) or less, and most preferably 1.5 g/($m^2 \cdot 24$ hr). Although there is no particular lower limit to the moisture permeability, it is usually 0.5 g/($m^2 \cdot 24$ hr).

The hardness measured based on JIS K6253 (15 seconds later) is 30 to 60 degrees in terms of JIS-A hardness. If the hardness is in the above range, the resin composition has satisfactory flexibility and appropriate mechanical physical properties.

Melt flow rate [MFR] (JIS K7210; 190° C., 52.185 N (5.325 Kgf)) is 10 g/10 minutes or less. If the MFR is in the above range, the resin composition has satisfactory injection moldability and satisfactory mechanical physical properties. The MFR is preferably 10 to 80 g/10 minutes, and more preferably 10 to 60 g/10 minutes.

Further, based on JIS K6251, the tensile strength and elongation (JIS K6251; dumbbell-shape No. 3 shape, 23° C.) are preferably 5 MPa or more and 400% or more, respectively, and more preferably 6 MPa or more and 500% or more, respectively.

In order for the resin composition of the present invention to have the above-mentioned properties, the content ratio of the (A) component, (B) component, and (C) component in the resin composition according to the present invention are preferably 5 to 40 parts by mass of the (B) component and 5 to 40 parts by mass of the (C) component based on 100 parts by mass of the (A) component, and more preferably 10 to 30 parts by mass of the (B) component and 15 to 35 parts by mass of the (C) component based on 100 parts by mass of the (A) component.

The second invention of the present invention is characterized in that the elastic member 31 is composed of a resin composition containing (D) a (b)-(a)-(b) type isobutylene-based triblock copolymer with a weight-average molecular weight of 50,000 to 80,000, having (a) a polymer block mainly including an isobutylene unit and (b) a polymer block mainly including a styrene unit and (E) a (d)-(c)-(d) type isobutylene-based triblock copolymer with a weight-average molecular weight of 90,000 to 130,000, having (c) a polymer block mainly including an isobutylene unit and (d) a polymer block mainly including a styrene-unit, in a mass ratio of 20:80 to 60:40, and having the following features:

(1) an air permeability [JIS K7126; A-method (differential pressure method), 40° C.] measured using a sheet sample with a thickness of 0.5 mm is 200 cm$^3$/(m$^2$·24 hr·atm) or less;
(2) a moisture permeability (JIS Z0208; 40° C., 90% RH) measured using a sheet sample with a thickness of 0.5 mm is 2.0 g/(m$^2$·24 hr) or less;
(3) a hardness [JIS K6253 (15 seconds later) is 30 to 60 degrees in terms of JIS-A hardness; and
(4) a melt flow rate [MFR] (JIS K7210; 270° C., 98.0665 N (10 Kgf)) is 5000 g/10 minutes.

Further, it is preferable that the elastic member 31 is a resin composition having the following feature in which
(5) tensile strength and elongation (JIS K6251; dumbbell-shape No. 3 shape, 23° C.) are 5 MPa or more and 300% or more, respectively.

In each of the isobutylene-based triblock copolymers of the above-mentioned (D) component and (E) component, (a) the polymer block mainly including an isobutylene unit and (c) the polymer block mainly including an isobutylene unit each denote a polymer block in which an isobutylene unit occupies 50 mass % or more, preferably 70 mass % or more, and more preferably 90 mass % or more. The monomer forming units other than an isobutylene unit in the polymer block mainly including an isobutylene unit is not particularly limited as long as it is a cation-polymerizable monomer. Examples thereof include monomers such as: aromatic vinyls; aliphatic olefins; dienes such as isoprene, butadiene, and diviylbenzene; allylethers; and β-pinene. They may be used alone or in combination of two or more kinds.

On the other hand, (b) the polymer block mainly including a styrene unit and (d) the polymer block mainly including a styrene unit each denote a polymer block in which a styrene unit occupies 50 mass % or more, preferably 70 mass % or more, and more preferably 90 mass % or more. The monomer forming units other than a styrene unit in the polymer block mainly including a styrene unit is not particularly limited as long as it is a cation-polymerizable monomer. Examples thereof include monomers such as: aromatic vinyls such as α-methylstyrene, β-methylstyrene, p-methylstyrene, tert-butylstyrene, monochlorostyrene, dichlorostyrene, methoxystyrene, and indene; aliphaticolefins; dienes; allylethers; and β-pinene. They may be used alone or in combination of two or more kinds.

The isobutylene-based triblock copolymer of the (D) component and the isobutylene-based triblock copolymer of the (E) component are a (b)-(a)-(b) type and a (d)-(c)-(d) type, respectively, and there is no particular limit to the content ratio between (a) the polymer block mainly including an isobutylene unit and (b) the polymer block mainly including a styrene unit, and the content ratio between (c) the polymer block mainly including an isobutylene unit and (d) the polymer block mainly including a styrene unit. However, in terms of the physical properties of a resin composition to be obtained, the content ratio is preferably the polymer block mainly including an isobutylene unit of 60 to 85 mass % and the polymer block mainly including a styrene unit of 40 to 15 mass %, and more preferably the polymer block mainly including an isobutylene unit of 65 to 80 mass % and the polymer block mainly including a styrene unit of 35 to 20 mass %.

In the present invention, the content ratio of the polymer block mainly including an isobutylene unit and the polymer block mainly including a styrene unit may be the same or different between the isobutylene-based triblock copolymer of the (D) component and the isobutylene-based triblock copolymer of the (E) component.

Further, in the present invention, the above-mentioned weight-average molecular weight of the isobutylene-based triblock copolymer of the (D) component is selected in a range of 50,000 to 80,000, and the weight-average molecular weight of the isobutylene triblock copolymer of the (E) component is selected in a range of 90,000 to 130,000. When the weight-average molecular weight of the (D) component is less than 50,000, although a resin composition to be obtained has satisfactory moldability, it has large compression permanent deformation and a poor restoring property. On the other hand, when the weight-average molecular weight of the (E) component exceeds 130,000, a resin composition to be obtained has poor moldability, making it difficult to perform injection molding. Note that, the weight-average molecular weight is a value under polystyrene conversion measured by gel permeation chromatography (GPC method).

In the present invention, the compounding ratio between the above-mentioned isobutylene-based triblock copolymer of the (D) component, and the isobutylene-based triblock copolymer of the (E) component is selected in a mass ratio range of 20:80 to 60:40. If the compounding ratio is in the above range, a resin composition having predetermined properties can be obtained, and the object of the present invention can be achieved. The preferable compounding ratio is in a mass ratio range of 25:75 to 45:55.

There is no particular limit to a method of producing the isobutylene-based triblock copolymer, and a conventionally known method can be used. For example, by using an inifer method (for example, a method disclosed by the specification of U.S. Pat. No. 4,276,394) of performing living cationic polymerization using a monofunctional component such as α-chlor-isopropylbenzene, a bifunctional component such as 1,4-bis(α-chloroisopropyl)benzene (also called p-dicumyl chloride), or a trifunctional component such as 1,3,5-tris(α-chloroisopropyl)benzene as an initiator and chain transfer agent, and using Lewis acid such as $BCl_3$ or $TiCl_4$ as a catalyst, a polymer mainly including an isobutylene unit of a controlled molecular weight is formed, and subsequently, a monomer mainly including styrene is added to cause copolymerization, whereby a desired isobutylene-based triblock copolymer can be obtained.

The resin composition according to the second invention of the present invention has properties shown below.

First, the air permeability [JIS K7126; A-method (differential pressure method), 40° C.] measured using a sheet sample with a thickness of 0.5 mm based on an A-method (differential pressure method) of JIS K7126 is 200 cm$^3$/(m$^2$·24 hr·atm) or less, which shows excellent gas barrier property. The air permeability is preferably 180 cm$^3$/(m$^2$·24 h·atm) or less, and more preferably 160 cm$^3$/(m$^2$·24 hr·atm)

or less. Although there is no particular lower limit to the air permeability, it is usually 50 cm$^3$/(m$^2$·24 hr·atm).

Further, the moisture permeability (JIS Z0208; 40° C., 90% RH) measured using a sheet sample with a thickness of 0.5 mm based on JIS Z0208 is 2.0 g/(m$^2$·24 hr) or less, which shows excellent barrier properties with respect to water vapor. The moisture permeability is preferably 1.8 g/(m$^2$·24 hr) or less, more preferably 1.7 g/(m$^2$·24 hr) or less, and most preferably 1.5 g/(m$^2$·24 hr). Although there is no particular lower limit to the moisture permeability, it is usually 0.5 g/(m$^2$·24 hr).

The hardness measured based on JIS K6253 (15 seconds later) is 30 to 60 degrees in terms of JIS-A hardness. If the hardness is in the above range, the resin composition has satisfactory flexibility and appropriate mechanical physical properties.

Melt flow rate [MFR] (JIS K7210; 270° C., 98.066 5N (10 Kgf)) is 5,000 g/10 minutes or less. If the MFR is in the above range, the resin composition has satisfactory injection moldability and satisfactory mechanical physical properties. The MFR is preferably 3,000 g/10 minutes or less, and more preferably 1,000 g/10 minutes or less.

Further, the tensile strength and elongation (JIS K6251; dumbbell-shape No. 3 shape, 23° C.) are preferably 5 MPa or more and 300% or more, respectively, and more preferably 6 MPa or more and 500% or more, respectively.

In the resin composition according to the present invention, in addition to the above-mentioned (A) to (E) components, various additives, for example, other thermoplastic elastomers and other olefin-based resins, and further, a plasticizer, a filling material, a reinforcing agent, a silane coupling agent, an adhesion providing agent, a radial crosslinking agent, a crosslinking aid, an anti-aging agent (a phenol-based antioxidant, an aromatic amine-based antioxidant, a sulfur-based hydroperoxide decomposer, a phosphorus-based hydroperoxide decomposer, a benzotriazole-based ultraviolet absorber, a salicylate-based ultraviolet absorber, a benzophenone-based ultraviolet absorber, a hindered amine-based light stabilizer, a nickel-based light stabilizer, etc.), a photocurable resin, waxes, a flowable modifier, a lubricant, a surfactant, a foaming agent, a flame retardant, a pigment, and the like can be appropriately compounded, if desired, in a range that does not impair the object of the present invention.

As a melt kneading apparatus, for example, a sealed kneading apparatus or a batch-type kneading apparatus such as a labo plastmill, a Brabender, a Banbury mixer, a kneader, or a roll, or a continuous melt kneading apparatus such as a uniaxial extruder or a biaxial extruder can be used.

The resin composition of the present invention thus obtained can be molded by a molding method and a molding apparatus generally adopted with respect to a thermoplastic resin composition, and can be melt-molded by, for example, extrusion molding, injection molding, press molding, blow molding, or the like.

These resin compositions can be easily heat-welded with synthetic resin constituting the film member 32, and a satisfactory airtight state can be ensured by performing heat welding. Further, the resin composition is a flexible material, and as shown in FIGS. 1 and 2, it can be bent in a U shape easily on its flat surface, whereby the degree at which resistance is given to the reciprocating movement of a carriage can be decreased.

Further, each surface of each film member 32 constituting the ink feed tube 20 is previously provided with a thin film 34 by aluminum laminate processing as shown in FIG. 6. Because of this, the ink feed tube 20 can be provided with the gas barrier property and the resistance to moisture permeability effectively.

On the other hand, on the connecting member 21 attached to each end portion of the above-mentioned ink feed tube 20, as shown in FIGS. 3 and 4, a connecting tube 23 formed in a prism shape is formed at a position opposed to each connecting tube 22 formed in a cylindrical shape. Then, an opening portion 25 is formed so as to pass through the cylindrical connecting tube 22 and the prismatic connecting tube 23. The above-mentioned prismatic connecting tube 23 is connected to each ink feed passage 33 formed in the ink feed tube 20 in each end portion of the ink feed tube 20.

In other words, the above-mentioned film members 32 are heat-welded to upper and lower surfaces of the above-mentioned prismatic connecting tube 23, as shown in FIG. 6, and further, the prismatic connecting tube 23 is press-fitted in an elastic member 31 on the right and left sides. It is desirable that side walls on the right and left sides of the prismatic connecting tube 23 to be press-fitted in the elastic member 31 are previously coated with an adhesive so that an airtight state with respect to the elastic member 31 after press-fitting can be held. Alternatively, it is preferable that a connecting member is formed using resin having compatibility with a resin composition of the elastic member, and the elastic member and the connecting member are integrally formed by insert processing or the like.

Figure 7:
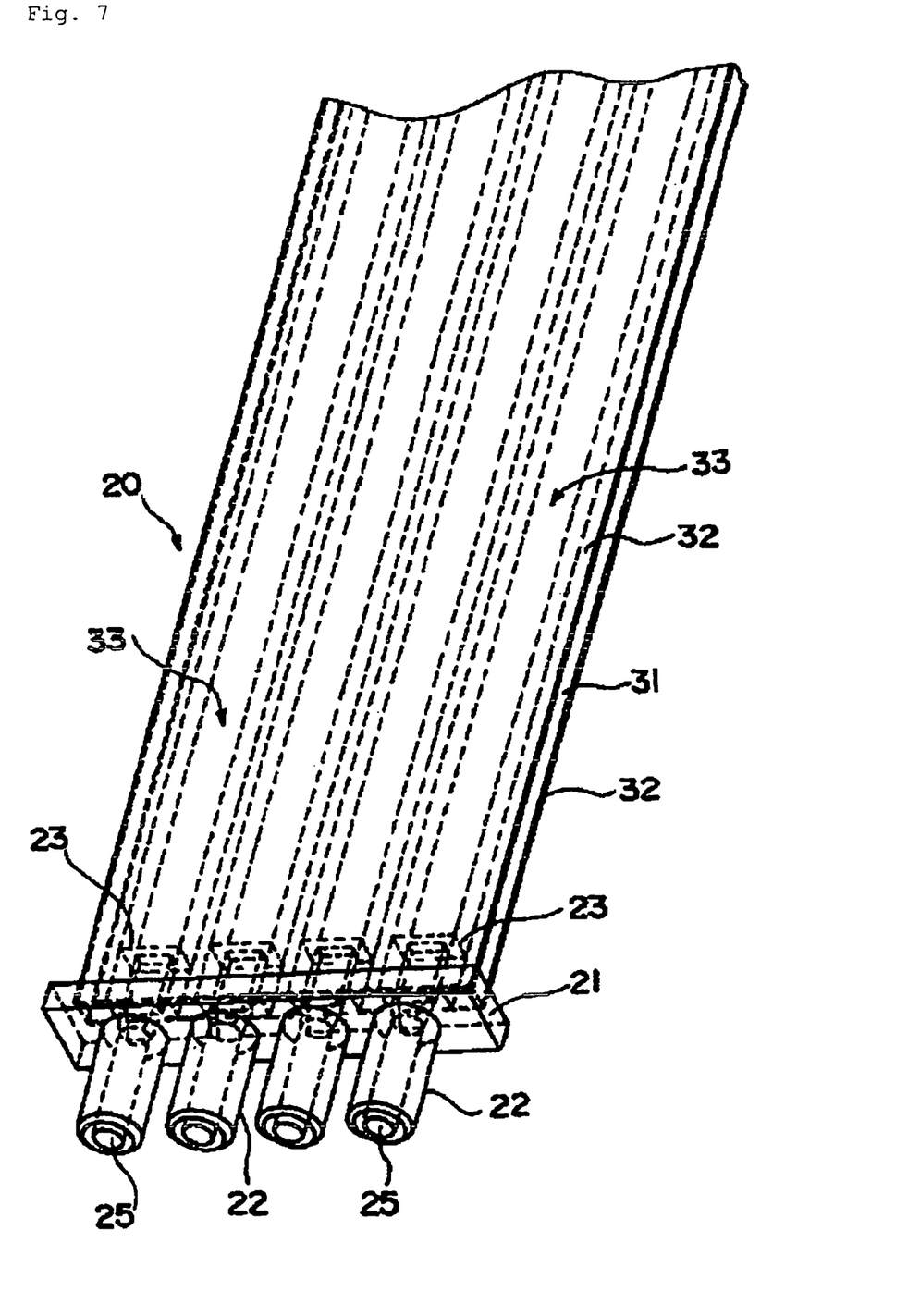
[FIG. 7] A perspective view showing an end portion of the ink feed tube in a perspective state.

FIG. 7 shows a perspective state in which the connecting member 21 is attached to the end portion of the above-mentioned ink feed tube 20, and shows the components corresponding to the respective portions already described with the same reference numerals.

In an off-carriage type recording apparatus of this type, the pressure fluctuation of ink may be caused on a recording head side due to the acceleration received by ink in the ink feed tube along with the reciprocating movement of the carriage 1. Thus, in the recording apparatus of this type, a damper member is mounted on a carriage, whereby the above-mentioned pressure fluctuation of ink is absorbed.

However, in the ink feed tube 20 described above, the ink feed passage 33 surrounded by the elastic members 31 and the film members 32 is allowed to have a damper function particularly by the elasticity of the film members 32. Thus, a recording apparatus that is not particularly required to have a damper member can also be provided using the ink feed tube 20 with the above-mentioned configuration.

Figure 8:
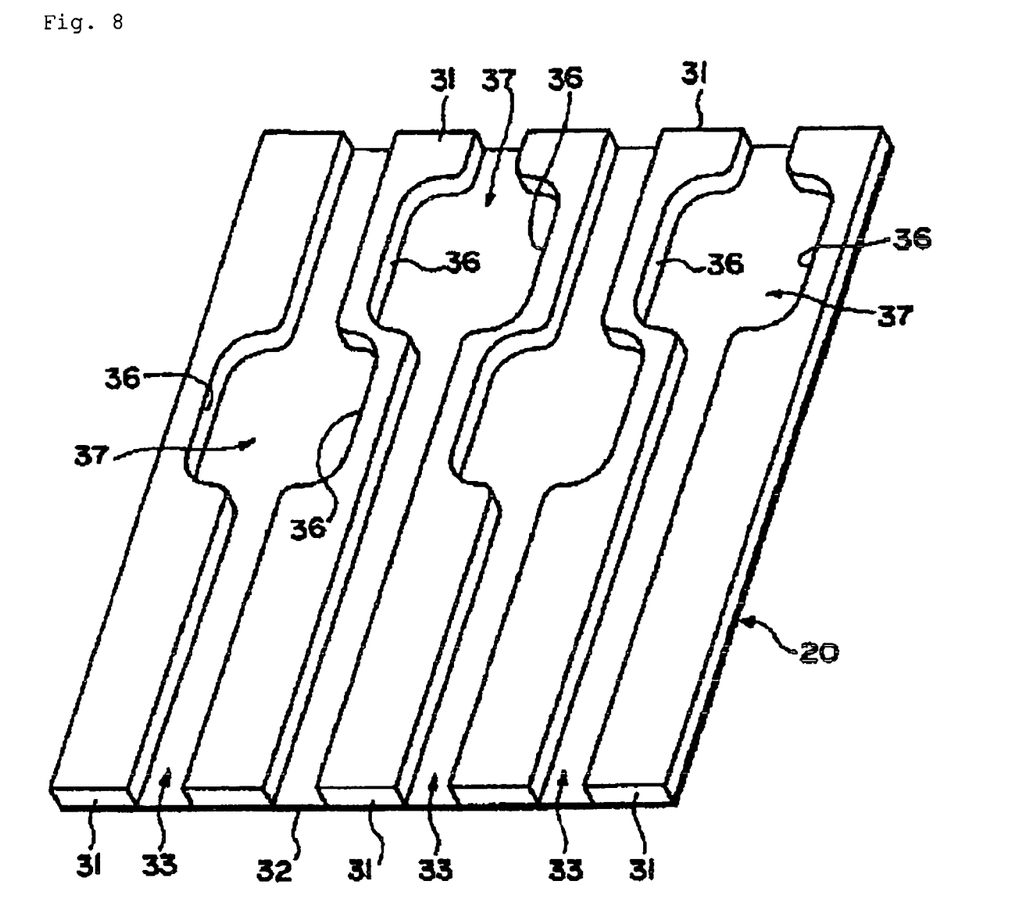
[FIG. 8] A perspective view showing an example in which a damper function is provided to a part of the ink feed tube.

On the other hand, in the ink feed tube 20 with the above-mentioned configuration, the damper function may not be obtained sufficiently by the film members 32. Then, as shown in FIG. 8, the following configuration, in which: cut-away portions 36 are provided in opposed parts of the respective adjacent elastic members 31, whereby enlarged space parts 37 with intervals of the opposed elastic member 31 extended are formed, can be preferably used. FIG. 8 shows a state in which the film member 32 on the upper surface is removed.

According to this configuration, owing to the enlarged space parts 37, a portion having a large area with the film members 32 can be ensured in a part of the ink feed tube 20, whereby the damper function can be exhibited effectively. It is desirable that the above-mentioned enlarged space parts 37 are disposed on the downstream side of the ink feed passage 33 in the ink feed tube 20, i.e., on the carriage 1 side.

Figure 9:
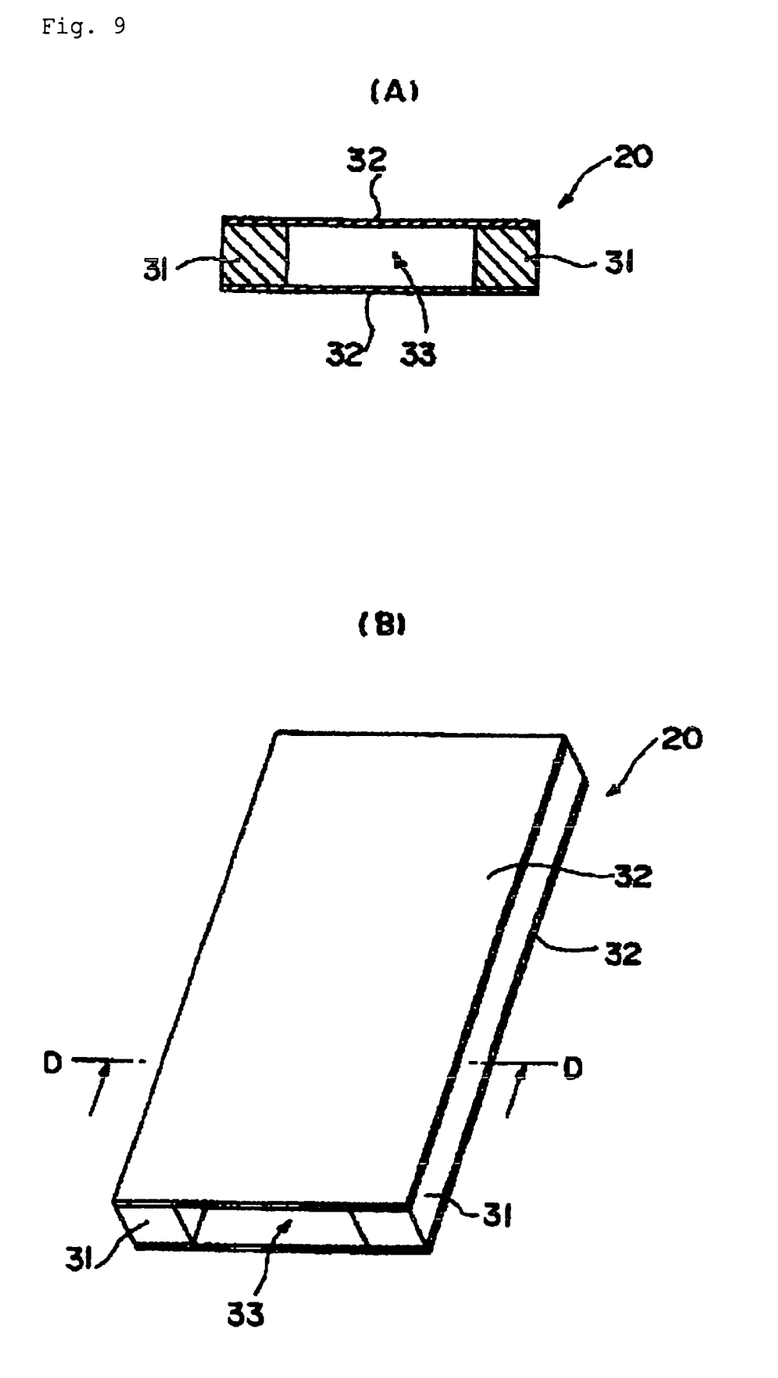

Next, FIG. 9 shows another preferable example of the ink feed tube according to the present invention. FIG. 9A is a cross-sectional view taken along the line D-D in a direction of arrows of FIG. 9B. FIG. 9B is a perspective view showing a state in which the longitudinal direction of the ink feed tube is shortened. In the ink feed tube 20 shown in FIG. 9, the pair of long elastic members 31 are arranged in parallel to each other, and on one surface and another surface of each elastic member 31, the film members 32 are connected in an airtight state. Then, a space part surrounded by each elastic member 31 and film member 32 constitutes an ink feed passage 33.

Even in the ink feed tube 20 shown in FIG. 9, it is desirable that an elastomer is used as the elastic member 31, and the upper and lower film members 32 are heat-welded to the elastomer, whereby the elastic member 31 and the film members 32 are connected in an airtight state. Further, although not shown in FIG. 9, it is desirable that a thin film 34 is previously provided on each outside portion of the upper and lower film members 32 by aluminum laminate processing in the same way as in the example shown in FIG. 6.

Also in the ink feed tube 20 shown in FIG. 9, connecting members made of synthetic resin are attached to both end portions, and the ink feed tube 20 is connected between the first and second connecting members 17 and 19 shown in FIG. 1, whereby ink is fed from the ink tank to the recording head side. Further, in the embodiment shown in FIG. 9, one ink feed passage 33 is formed for one ink feed tube 20. Therefore, in the recording apparatus with the configuration shown in FIG. 1, four ink feed tubes 20 are used independently.

Also in the embodiment of the ink feed tube 20 shown in FIG. 9, a relatively soft material is selected as an elastomer that serves as the elastic member 31, whereby the degree at which resistance is given to the reciprocating movement of the carriage can be reduced remarkably. A thin film is provided on each surface of the film members 32 constituting the ink feed tube 20 by aluminum laminate processing as described, whereby the ink feed tube 20 can be provided with the gas barrier property and the resistance to moisture permeability effectively.

Figure 10:
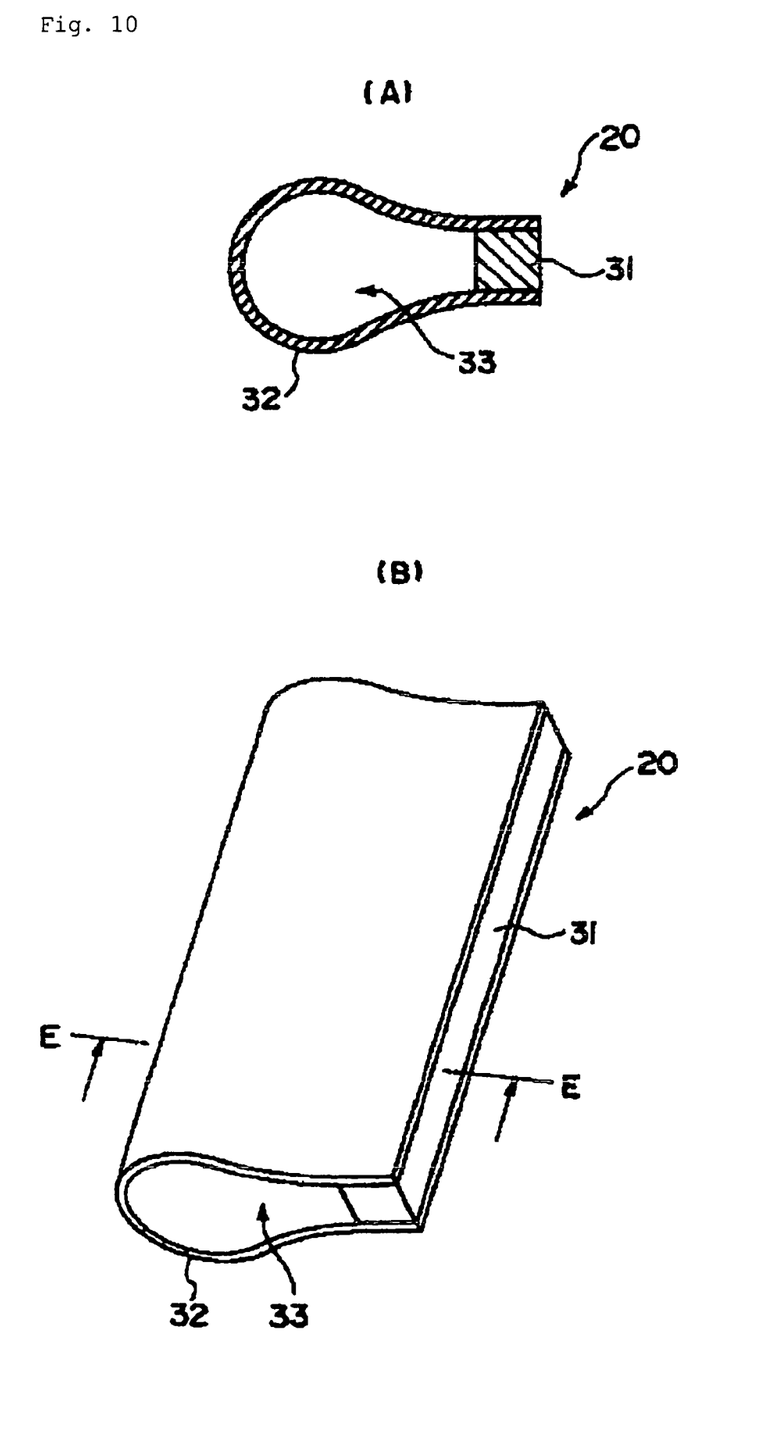

Finally, FIG. 10 shows still another preferable example of the ink feed tube according to the present invention. FIG. 10A is a cross-sectional view taken along the line E-E in a direction of arrows of FIG. 10B. FIG. 10B is a perspective view showing a state in which the longitudinal direction of the ink feed tube is shortened. In the ink feed tube 20 shown in FIG. 10, on one surface and another surface of the long elastic member 31, both ends of the film member 32 perpendicular to the longitudinal direction thereof is connected in an airtight state.

In other words, the film member 32 is connected to two surfaces of the elastic member 31 in a bag shape, whereby the ink feed passage 33 is formed. Because of this, the peripheral length by the film member 32 is formed larger than the peripheral length by the elastic member 31 on the inner surface of the ink feed passage 33, i.e., the thickness of the elastic member 31.

Even in the ink feed tube 20 shown in FIG. 10, an elastomer is used as the elastic member 31, and the film member 32 is heat-welded to the elastomer serving as the elastic member 31 in a bag shape, whereby the elastic member 31 and the film member 32 are connected in an airtight state. Further, although not shown in FIG. 10, it is desirable that the thin film 34 is previously provided on the outside portion of the film member 32 to be connected in a bag shape by aluminum laminate processing in the same way as in the example shown in FIG. 6.

Also in the ink feed tube 20 shown in FIG. 10, connecting members made of synthetic resin are attached to both end portions, and the ink feed tube 20 is connected between the first and second connecting members 17 and 19 shown in FIG. 1, whereby ink is fed from the ink tank to the recording head side. Further, in the embodiment shown in FIG. 10, one ink feed passage 33 is formed for one ink feed tube 20. Therefore, in the recording apparatus with the configuration shown in FIG. 1, four ink feed tubes 20 are used independently.

As well as the previous embodiments, in the embodiment of the ink feed tube 20 shown in FIG. 10, a relatively soft material is selected as an elastomer that functions as the elastic member 31, whereby the degree at which resistance is given to the reciprocating movement of the carriage can be reduced remarkably. A thin film is provided on a surface of the film member 32 constituting the ink feed tube 20 by aluminum laminate processing as described, whereby the ink feed tube 20 can be provided with the gas barrier property and the resistance to moisture permeability effectively.

In each of the above embodiments, as the liquid jetting device, a recording apparatus (i.e., a printing apparatus including a facsimile or a copier) discharging ink has been described. However, other liquid jetting devices for jetting a liquid may be used. For example, a liquid jetting device for jetting a liquid of an electrode material, a coloring material, or the like used in the production of a liquid crystal display, an EL display, and a surface-emitting display, a liquid jetting device for jetting a bio-organic material used in the production of a biochip, and a sample jetting device serving as a precision pipette may be used.

INDUSTRIAL APPLICABILITY

In the liquid jetting device using a liquid feed tube according to the present invention, the liquid feed tube includes: a long elastic member; a film member connected in an airtight state to the elastic member along the longitudinal direction of the elastic member; and a space part formed by the elastic member and the film member and used as a liquid feed passage, and a particular member is used as the elastic member. Therefore, the bending rigidity thereof can be decreased, and the degree at which resistance is given to the reciprocating movement of the carriage can be reduced remarkably. Further, a thin film such as an aluminum laminate layer is formed previously on the above-mentioned film member constituting the liquid feed tube, whereby the resistance to moisture permeability and the gas barrier property of the liquid feed tube can be realized at low cost.

The invention claimed is:

1. A liquid feed tube for feeding a liquid from a liquid tank disposed on a liquid jetting device body side to a jetting head mounted on a reciprocating carriage, comprising:
    a long elastic member and
    a film member connected in an airtight state to the elastic member along a longitudinal direction of the elastic member; and a space part formed by the elastic member and the film member and used as a liquid feed passage, wherein the elastic member is made of a resin composition containing (A) a (b)-(a)-(b) type isobutylene-based triblock copolymer having (a) a polymer block mainly including an isobutylene unit and (b) a polymer block mainly including a styrene unit, (B) an ethylene-based polymer and/or a propylene-based polymer, and (C) a liquid polybutene, and having the following features:
    (1) an air permeability [JIS K7126; A-method (differential pressure method), 40° C.] measured using a sheet sample with a thickness of 0.5 mm is 200 $cm^3/(m^2 \cdot 24\ hr \cdot atm)$ or less;
    (2) a moisture permeability (JIS Z0208; 40° C., 90%RH) measured using a sheet sample with a thickness of 0.5 mm is 2.0 $g/(m^2 \cdot 24\ hr)$ or less;
    (3) a hardness [JIS K6253 (15 seconds later) is 30 to 60 degrees in terms of JIS-A hardness; and (4) a melt flow rate [MFR](JIS K7210; 190° C., 52.185 N(5.325 Kgf)) is 100 g/10 minutes or less.

2. The liquid feed tube according to claim 1, wherein the resin composition further has the following feature:
- (5) tensile strength and elongation (JIS K6251; dumbbell-shape No. 3 shape, 23° C.) are 5 MPa or more and 400% or more, respectively.

3. A liquid jetting device, characterized by comprising the liquid feed tube according to claim 1.

4. A liquid feed tube for feeding a liquid from a liquid tank disposed on a liquid jetting device body side to a jetting head mounted on a reciprocating carriage, comprising:
- a long elastic member and
- a film member connected in an airtight state to the elastic member along a longitudinal direction of the elastic member; and a space part formed by the elastic member and the film member and used as a liquid feed passage, wherein the elastic member is made of a resin composition containing (D) a (b)-(a)-(b) type isobutylene-based triblock copolymer with a weight-average molecular weight of 50,000 to 80,000, having (a) a polymer block mainly including an isobutylene unit and (b) a polymer block mainly including a styrene unit and (E) a (d)-(c)-(d) type isobutylene-based triblock copolymer with a weight-average molecular weight of 90,000 to 130,000, having (c) a polymer block mainly including an isobutylene unit and (d) a polymer block mainly including a styrene unit, in a mass ratio of 20:80 to 60:40, and having the following features:
- (1) an air permeability [JIS K7126; A-method (differential pressure method), 40° C.] measured using a sheet sample with a thickness of 0.5 mm is 200 $cm^3/(m^2 \cdot 24\ hr \cdot atm)$ or less;
- (2) a moisture permeability (JIS Z0208; 40° C., 90% RH) measured using a sheet sample with a thickness of 0.5 mm is 2.0 $g/(m^2 \cdot 24\ hr)$ or less;
- (3) a hardness [JIS K6253 (15 seconds later) is 30 to 60 degrees in terms of JIS-A hardness; and
- (4) a melt flow rate [MFR](JIS K7210; 270° C., 98.0665 N(10 Kgf)) is 5000 g/10 minutes or less.

5. The liquid feed tube according to claim 4, wherein the resin composition further has the following feature:
- (5) tensile strength and elongation (JIS K6251; dumbbell-shape No. 3 shape, 23° C.) are 5 MPa or more and 400% or more, respectively.

6. A liquid jetting device, characterized by comprising the liquid feed tube according to claim 4.

* * * * *